UNITED STATES PATENT OFFICE.

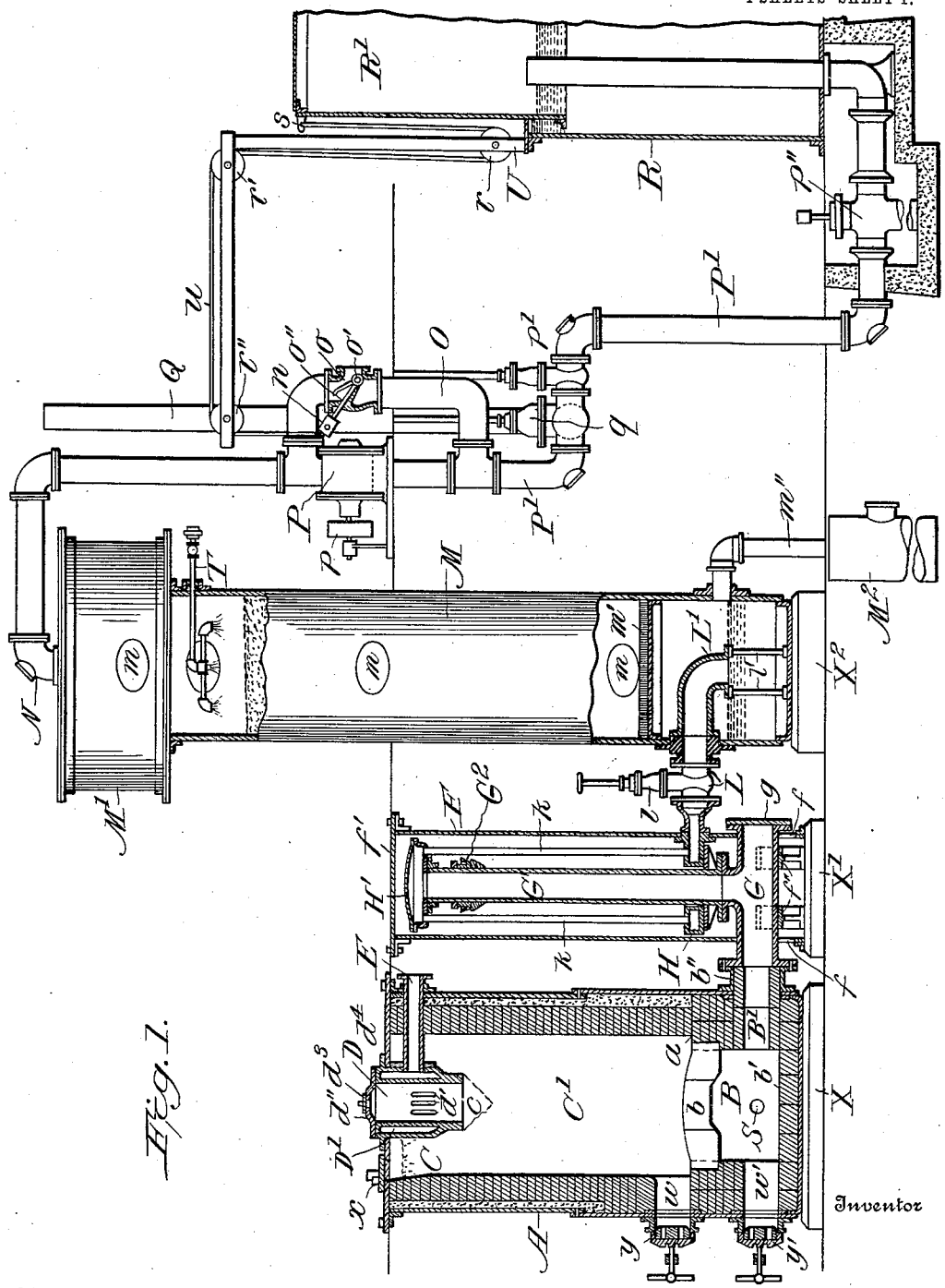

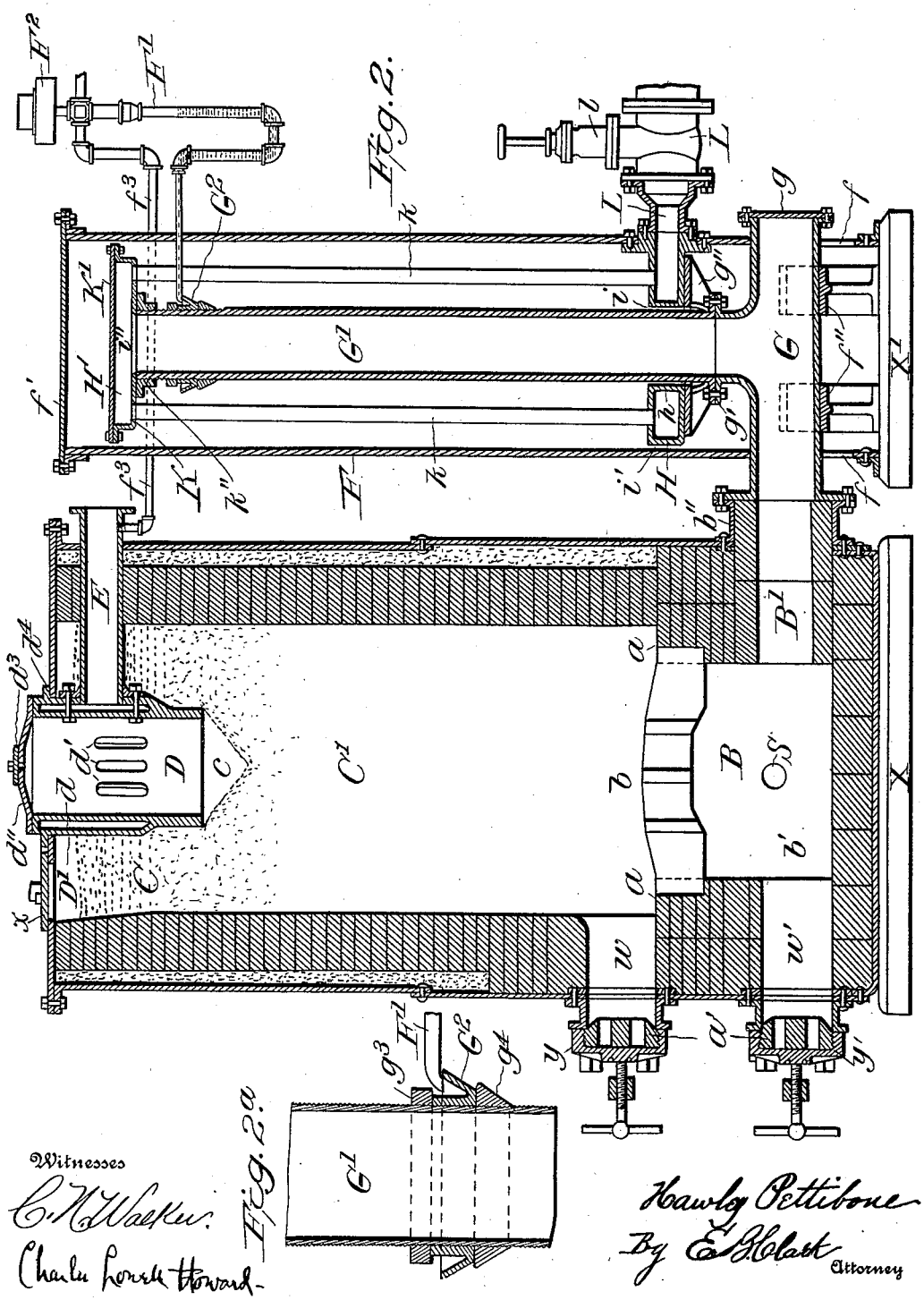

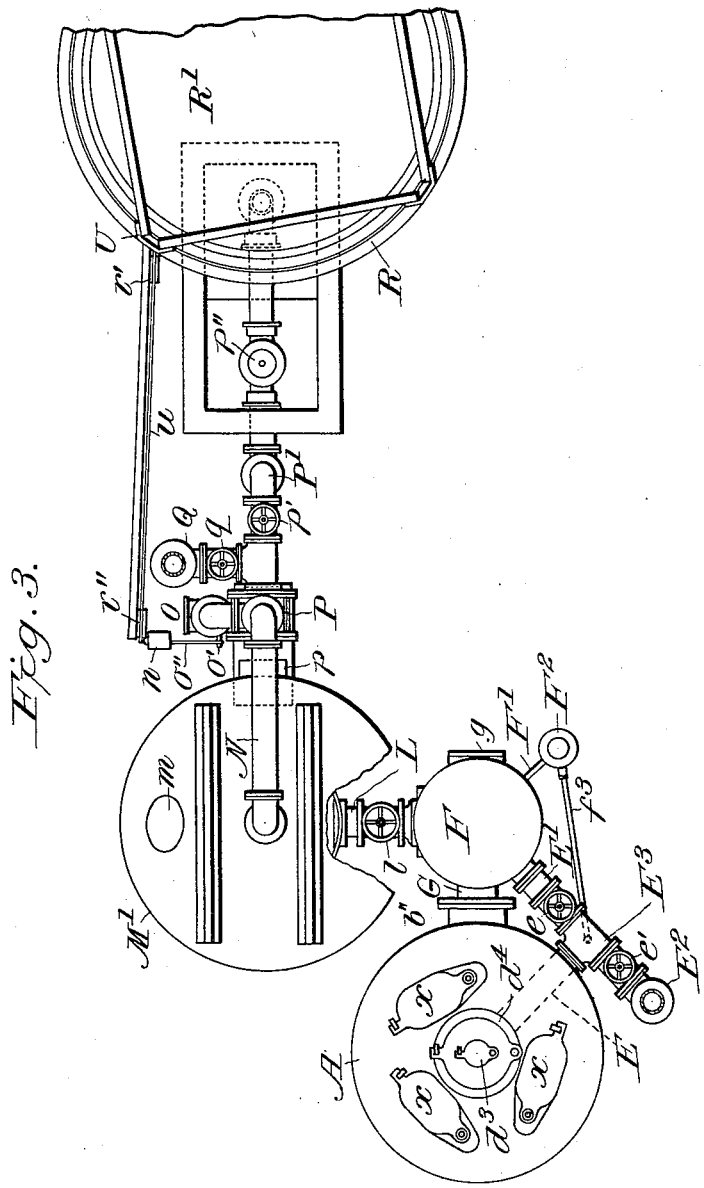

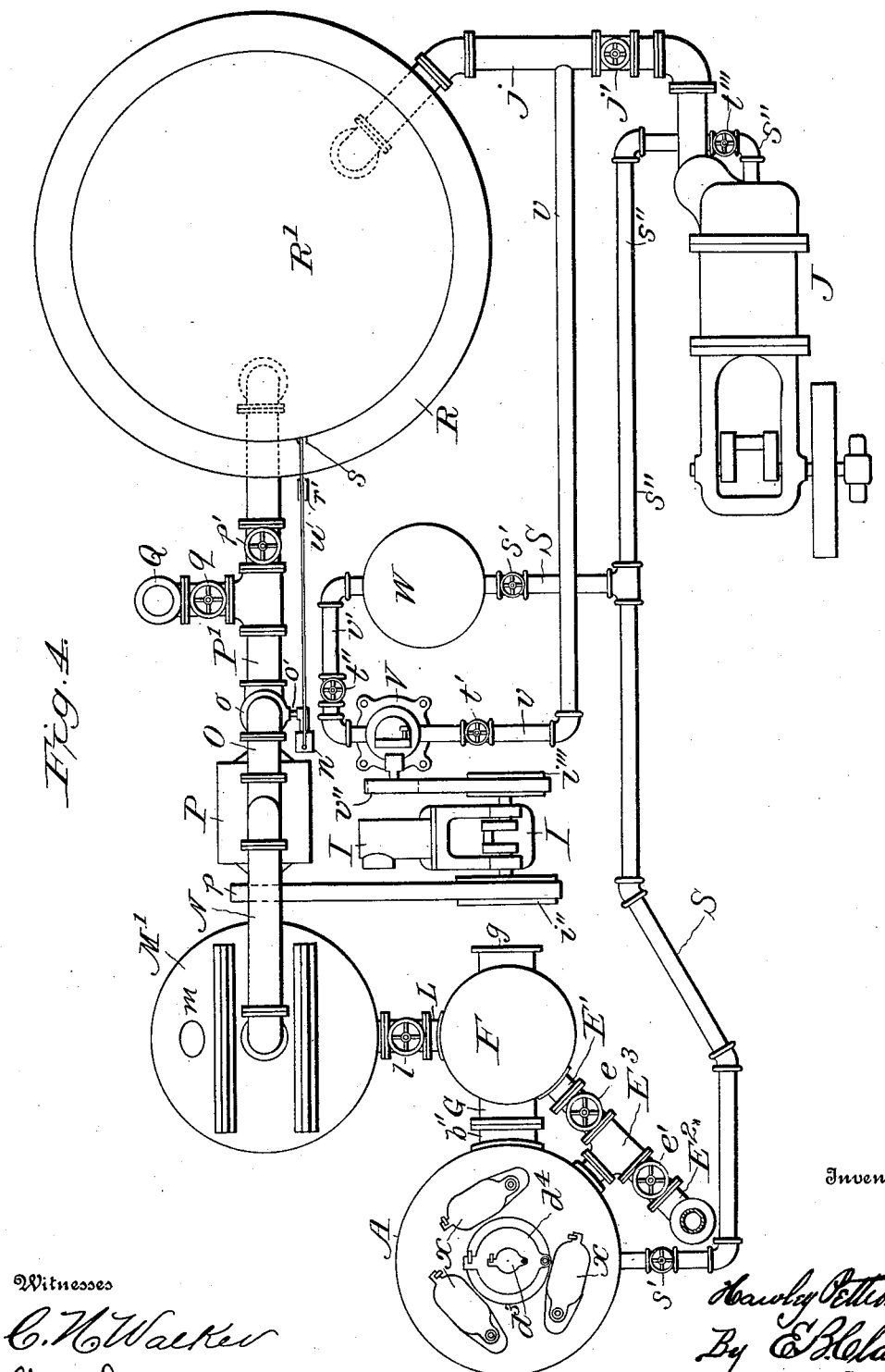

HAWLEY PETTIBONE, OF NEW ROCHELLE, NEW YORK, ASSIGNOR TO THE POWER AND MINING MACHINERY COMPANY, A CORPORATION OF NEW JERSEY.

APPARATUS FOR MANUFACTURING GAS.

1,007,385.     Specification of Letters Patent.     Patented Oct. 31, 1911.

Application filed February 1, 1907. Serial No. 355,191.

*To all whom it may concern:*

Be it known that I, HAWLEY PETTIBONE, a citizen of the United States, residing at New Rochelle, in the county of Westchester and State of New York, have invented certain new and useful Improvements in Apparatus for Manufacturing Gas, of which the following is a specification.

This invention relates to apparatus for manufacturing and delivering gas suitable for motive power and heating purposes.

The object of my invention is to provide for introducing air to support combustion, centrally into a body of fuel and cause such air and resulting gaseous products to flow downward centrally by exhaust so as to prevent active combustion and clinkering along, or adjacent to the side walls of the producer.

Another object is to provide for delivering or admitting hot air and steam centrally into a body of fuel in a cupola generator or producer and fresh fuel circumferentially around and above the air and steam inlet so as to cause the gaseous products distilled from such fresh fuel to mingle with the air and steam and pass down centrally through the body of incandescent fuel below for conversion into fixed high grade gas.

Another object is to provide for generating gas by down-draft in a cupola generator and intermittently cleaning the fire by a counter-blast of aeriform fluid, admitted under pressure and impulses into the base or below the incandescent fuel and discharging or blowing the resulting products, dust and ashes into the open air.

Another object is to provide for generating gas, compressing and storing a volume of such gas under pressure produced independently of the main gas engine, and intermittently admitting such gas in impulses into the base or below the body of incandescent fuel for cleaning the fire of dust and ashes.

The apparatus comprises, broadly considered, a down-draft gas-producer furnace, a preheater, or combined air heater and water-vaporizer, a wet and a dry scrubber, a positive exhauster, a by-pass and valved pipe connecting with the inlet and outlet pipes of the exhauster, automatic control devices connecting the holder and by-pass valve, suitable purge pipes and valves and details of construction as will be described by reference to the accompanying drawings, in which—

Figure 1 represents an elevation, partly in vertical section, of the apparatus. Fig. 2 represents a vertical section, on enlarged scale, of the generator or producer, preheater, and water feed devices. Fig. 2$^a$ represents a sectional view on enlarged scale of part of the preheater showing a water overflow cup on the gas up-take pipe. Fig. 3 represents a top plan view of a convenient arrangement of the apparatus, the scrubber being set back of the preheater. Fig. 4 represents a similar top plan view with additional devices for carrying out my process of manufacturing gas.

The cupola generator or producer A is constructed with the usual plate iron shell, riveted together, and fire-brick lining on a concrete foundation X, and is provided with a contracted ash-pit B, having a brick floor $b'$ and, preferably, with an arched brick grate $b$ and hearth $a$. As shown in Fig. 2, the ash-pit is of less internal diameter than the fuel chamber, the walls of the former being built up extra thick from the base to the grate level, and there forming an annular hearth $a$ at the base of the fuel chamber and a contracted grate opening. Since an exhauster is used, taking gases away by downdraft, this contracted grate opening and annular hearth causes the gases to be drawn away from the brick lining, or to be drawn downward without active combustion along the lining. The central air supply at the top also aids this action. Clinkering and its injurious effects at the brick lining are avoided or almost entirely overcome.

In the wall of the ash-pit is provided a brick-lined gas outlet flue $B^1$ extending out into an iron casing $b''$ bolted to the iron shell, and having an outer flange to which is bolted the flange of the gas outlet pipe G. The top plate of the cupola is provided with three, more or less, oblong fuel supply openings, arranged around the central air supply chamber, and closed by tight fitting lids $x$. At the grate level is provided a clean-out opening $w$ and a door frame closed by the door $y$ having a brick lining $a'$. A similar opening $w'$, a door frame and door $y'$ are provided in the ash-pit, and both doors are provided with the usual fastening devices.

In the top plate is made a large central opening into which is set the central, downwardly projecting air supply chamber, or pipe D, supported by a flange $d^4$, near the top and having an outer jacket $D^1$ forming an annular inlet passage $d$. The inner wall of this passage is provided with numerous vertical inlet ports $d'$ into the interior of chamber D, causing the inflowing air, or air and steam, to be discharged centrally into the body of fuel in the main chamber $C^1$. The chamber D is closed at the top by a tight fitting cover $d''$ which is provided with a poke-hole, closed by a small cover $d^3$. The chamber or pipe D may be made of different lengths and may extend deeper into the body of fuel than shown. Between the wall of the cupola and chamber D is formed an annular green-fuel reservoir or magazine C, which supplies fuel to the main chamber $C^1$ below, and forms an inverted cone-space $c$ below chamber D. A hot air and vapor supply pipe E passes through the wall of the cupola and connects with the jacket $D^1$ of chamber D and at the outer end with a T-coupling $E^3$, Fig. 3, to which is connected a pipe $E^1$, having a valve $e$, leading to the pre-heater F, and a purge-pipe $E^2$, having a valve $e'$, and leading to the open air for the escape of products, ash and cinder, when the fire is cleaned by a counter-blast.

The preheater F is constructed with an outer iron shell on a concrete foundation $X^1$ and is closed at the top by a plate $f'$ and has at its lower end the air inlet ports $f$ and the supporting saddles $f''$. The gas outlet pipe G connects with casing $b''$ and extends through shell F and is closed at the outer end by a plate $g$, and rests upon the posts or saddles $f''$. This pipe G has an upward extension with flange $g'$ to which is connected the up-take pipe $G'$ extending centrally into the preheater shell F. An annular supporting plate and brackets $g''$ are also secured to flange $g'$. In constructing the preheater we provide an annular lower chamber H, resting on the bracket support $g''$, and an upper head $H^1$ and pipe connections. The lower chamber H is constructed with a circular inner wall $h$ of larger diameter than pipe $G^1$ to provide an air passage $i$ between them. The gas chamber H is also bolted to the outer shell as shown at the pipe connection L, but is of smaller diameter than the shell F so as to provide an annular air-passage $i'$ between it and the shell. The upper head $H^1$ is composed of plates K and $K^1$ bolted together and forming a gas chamber $i''$. The lower curved plate K forms a tube sheet and is connected at the central opening to the up-take pipe $G^1$, preferably by a collar and screw-threaded connection $k''$. To the plate K is connected an annular cluster of gas-return tubes $k$ extending down into the gas chamber H.

To the upper end of the gas up-take pipe $G^1$, Figs. 2 and 2ª, is connected an annular water cup $G^2$ for distributing water by overflow in a thin film on said pipe. This cup may be connected by a screw-threaded joint as shown and is adjusted in a perfectly level position by upper and lower lock nuts $g^3$ and $g^4$. An elevated water feed-tank $F^2$ connects by a trap-pipe $F^1$ with cup $G^2$. A vacuum pipe $f^3$ connects pipe E with the interior of feed-tank F so that the degree of vacuum in the generator will be communicated to said tank and thus automatically control the feed or flow of water through pipe F to cup $G^2$.

The gas outlet pipe L connects with gas chamber H and with shell F, is provided with valve $l$, and extends into the base of scrubber M, where it terminates in a turned down end or dip-pipe $L^1$ resting by its flange on supporting posts $l'$ rising from the bottom plate of the scrubber. A well-known form of wet scrubber M is supported on a foundation $X^2$ and is provided with man-holes and covers $m$, and horizontal grids $m'$ for supporting bodies of coke. An overflow pipe $m''$ connects with the shell of the scrubber at the desired water level and extends down into a seal-pot $M^2$. A dry scrubber $M^1$ is, preferably, superposed on the scrubber M, and is provided with man-holes and covers $m$. A water supply pipe T having branches and spraying devices, leads into the top of scrubber M. A gas outlet pipe N leads from the top of scrubber $M^1$ to the positive exhauster P which is provided with a shaft on which is fixed a belt pulley $p$. Any desired power or a motor may be connected directly to the exhauster. A gas pipe $P^1$ leads from the exhauster down and then up into the holder R, $R^1$ and is provided with a valve $p'$ and a trap $p''$. Beyond, or below the exhauster, in a horizontal part of pipe $P^1$ is connected a purge pipe Q, having a valve $q$, extending up and discharging into the open air. This pipe serves for discharging waste gaseous products when starting the generator, or at the desired time. A by-pass O connects above the exhauster with gas pipe N and below with the discharge pipe $P^1$, leading from the exhauster, and is provided with a hinged valve $o$ having a shaft $o'$ and closing downward on a circumferential seat so that it will be free to open when gas is to be circulated through the exhauster and by-pass pipe. The hinge-shaft $o'$ passes horizontally through the valve-casing and has secured to its outer end a lever-arm $o''$ having on it an adjustable weight $n$ for normally holding the valve to its seat. To this lever-arm is connected a cord or light chain $u$ which passes over pulleys and is connected to an eye or staple $s$ at the top of the holder-bell $R^1$. The pulleys may be arranged in any suitable manner, and for the purpose of illustration I have shown a post U connecting to the holder-tank, and having a lower pulley $r$ attached thereto, an upper pulley $r'$ being attached to a cross-bar $U^1$, and a third pulley $r''$ being attached to said bar above the valve $o$.

As shown, the cord or chain $u$ passes from the top of bell $R^1$ down around pulley $r$; then up over pulley $r'$, over pulley $r''$ and down to the lever-arm $o''$ to which it is attached. The details of construction of mechanism connecting the holder-bell with the by-pass valve may be varied so as to perform the operation of automatically opening said valve by the rise of the holder in a manner substantially as above described. By means of this mechanism the holder-bell, when filled with gas and raised, will open by-pass valve $o$ and the exhauster P will then simply circulate gas through its pipe connections and by-pass pipe O, automatically stopping the operation of drawing air into the preheater and producer, and, therefore, practically stopping or checking the production of gas. So soon as the gas has been drawn from the holder sufficiently to lower the bell, the by-pass valve will be gradually closed and the exhauster will again draw off gas from the producer, at the same time drawing air and vapor or steam into the bed of fuel, thereby continuing the production of gas. This mechanism is very simple in construction and effective in operation for automatically controlling the production of gas.

At any suitable place in the base of the cupola, and preferably at the ash-pit B is connected an inlet pipe S for admitting compressed gas for cleaning and regulating the fire or body of incandescent fuel. In the operation of drawing air or air and steam down into a body of hot fuel and drawing the resulting gas down through the same for a period of a few hours (eight to twelve, more or less) the interstices of the fuel become plugged with ash and cinder to such an extent that very little air, or steam will pass through or be decomposed therein; and consequently the yield of gas falls much below the normal production and is often insufficient to meet the demand. In order to overcome this difficulty, to make the production more uniform and continuous, and avoid the interruption and delay incident to opening the clean-out door and removing ash, cinder, etc., from the base of the fuel chamber, I draw from the holder $R^1$ part of the stored gas, compress it by a compressing pump, preferably operated by an engine or motor independent of the main gas engine, and store it in a special tank or holder under a pressure of about one hundred and fifty pounds to the square inch, and at intervals admit sudden puffs or blasts of such gas into the base of the fuel. Before a blast of compressed gas is admitted through pipe S, valve $e$ in pipe $E^1$, Fig. 3, is closed and valve $e'$ in purge pipe $E^2$ opened, permitting dust and ashes to be blown out into the open air. Any good combustible gas may be compressed and used as above described, and a combustible gas, such as is stored in holder $R^1$, is advantageous for the reason that a blast of such gas does not deaden the fire and check the production of gas as will a waste inert gas, composed principally of nitrogen and carbonic acid, or products of combustion from a gas engine or other source.

In Fig. 4 I have shown diagrammatically, in plan view, apparatus for storing gas under pressure, including a motor or auxiliary engine and connections for operating the exhauster and the compresson pump—including also a main gas engine and other connections. The main gas engine J may be of any well-known construction and is supplied with gas by pipe $j$, leading from holder $R^1$ and having a valve $j'$. An auxiliary gas or gasoline engine I, or other motor (not shown) is used for operating a compression pump V, having a gas supply pipe $v$ leading from gas pipe $j$ and provided with a valve $t'$, and a discharge pipe $v'$ connecting with the gas storage tank W and provided with a valve $t''$. The engine or motor I connects by a belt-wheel $i''$ and belt with the belt-wheel $p$ of the exhauster P for driving the latter; it also connects by belt-wheel $i'''$ and a belt with wheel $v''$ of compressor V. A pipe S, having a valve $s'$, connects with storage tank W and leads to the base of the producer or cupola, preferably connecting with the ash-pit B, as shown in Fig. 2. The gas compressed and stored in tank W may be used when desired for starting the main power engine J as, for instance, in the morning, or at other time, when the gas is nearly or quite exhausted from holder $R^1$. During operation of the plant, precaution is taken to keep the tank W full of compressed gas, preferably at about one hundred and fifty pounds to the square inch. When starting the engine J valve $t'''$ may be opened, admitting gas through branch pipe $s''$ and pipe S from tank W to the engine. This is a practical and satisfactory means for starting engine J whenever required.

The operation of the apparatus is very simple and may be conducted by an unskilled laborer. A fire is kindled on the grate in chamber $C^1$, and may be first allowed to burn by natural draft while fuel is gradually fed in until a deep body thereof is well ignited. When kindling the fire and igniting a body of fuel, the top cover $d''$ of the air chamber may be open for a part or the whole of the time, but when gas is to be drawn off by the exhauster such cover will be closed. The exhauster P being put in operation, air will be drawn through openings $f$ into the preheater F, through pipe E and thence down through the central air supply pipe D into the body of fuel and the resulting producer gas is drawn centrally down through the body of incandescent fuel, through the contracted grate into the main gas take-up pipe $G^1$, thence through the return pipes in the preheater and out through pipe L into the base of the scrubber. The gas will be then drawn up through the scrubber and off through the exhauster. If it is of sufficiently good quality to use for heating or motive power purposes it is stored in the holder $R^1$, but if it is of poor quality and not fit to store, the valve $p'$ is closed while valve $q$ is opened, permitting the waste gas to pass up through the purge pipe Q. The hot gas passing through the uptake pipe $G^1$ of the preheater will vaporize water which overflows from the cup $G^2$ and flows in a thin film down the said pipe $G^1$. Air is admitted through openings $f$ and circulates up through the passes $i, i'$ around the gas pipes $G^1$ and $k$ will also be heated. The commingled heated air and water vapor or steam passes by pipes E down through the inlet chamber D and centrally down into the body of fuel. By the operation of the exhauster and by reason of circumferential hearth $a$ and contracted grate opening, the gas of combustion and the gas arising from distillation of the body of fuel in the reservoir C will be drawn centrally down through the body of fuel and away from the brick lining, thereby largely preventing the formation of channels along the wall and the formation of clinker by too active combustion adjacent thereto. Better gasification of the fuel and production of fixed gas are thereby effected, and the operation of the producer is made more regular and uniform. At suitable intervals fresh fuel, preferably bituminous coal, is supplied through the top openings around the air chamber D so as to keep the reservoir C nearly full. The zone of active combustion will be a short distance below the inverted cone of fuel $c$, below the central supply chamber D, and distillation of the fresh fuel in reservoir C will proceed above such zone, and the hydrocarbon gas distilled from the coal will mix with the gases of combustion and will be converted into fixed gas by passage through the body of incandescent fuel in the chamber $C^1$. By introducing air centrally into the body of fuel, active combustion will take place immediately at the central part of the fuel and oxygen of the air will be consumed or combined with carbon, (forming carbon monoxid) before it can reach the brick lining and there cause high heat and injury to the brick, or formation of clinker thereon. This saves much trouble and expense ordinarily incurred in cleaning the side wall, insures a more uniform generation of gas, and is otherwise quite important and advantageous in practice. At any desired time the end plate $g$ of the outlet gas pipe G may be removed and dust and ashes cleaned out from pipe G. By this means the pipes of the preheater, and especially pipe $G^1$, may be kept comparatively clean.

After operating the producer for several hours by downdraft the bed of fuel becomes impacted or plugged with ash and cinder so that it is very difficult to draw air and water vapor, or gas, through it, and consequently the yield of gas falls much below the normal and is often insufficient to meet the requirements of gas for power or fuel purposes. When this condition arises the valve $e'$ in the purge pipe $E^2$ is opened, valve $e$ in the air inlet pipe E is closed, and gas valve $l$ between the preheater and scrubber, is closed, and then a blast of compressed gas is admitted, by opening valve $s'$, in a sudden impulse or puff through pipe S into the ash-pit. This sudden blast or puff of compressed gas will loosen up the body of impacted fuel in chamber $C^1$ and clean out the ash and cinder from the interstices thereof and blow the same up and out through the purge-pipe $E^2$. This operation may be repeated at short intervals until the body of fuel is well opened and cleaned. I have found in practice that a comparatively small amount of compressed gas will serve the purpose and that the operation can be performed very quickly (in an instant) so as not to materially interfere with the generation of gas. Though I prefer to compress and store in tank W part of the gas produced in furnace A, as being more convenient and satisfactory for the purposes above described, my invention is not confined to such specific operation, and I may compress and store under pressure any good combustible gas which will serve for starting the main engine J and for blasting the fuel to blow out dust and ashes. By the use of combustible gas for this purpose the fire is not deadened or the temperature lowered, so that the production and delivery of gas at full or increased volume may be resumed immediately on opening valve $e$ and closing the purge valve and opening valve $l$ in gas outlet pipe L. This is quite important from a point of economy, and also for the purpose constantly delivering a sufficient volume of gas for the large power engine or engines which are in operation. If steam is used under pressure and impulse for cleaning the fire, the temperature is immediately lowered, due to decomposition, to an objectionable degree. If gas containing much carbonic acid, or products of combustion is used much heat is absorbed from the fuel by conversion of carbonic acid into carbon monoxid, and this product is blown away and wasted.

By running the exhauster continuously, during operation of the plant, much time and power are economized for the reason that I avoid the necessity of overcoming the resistance or inertia of the gas in the generator, preheater or economizer and scrubber due to stopping and then starting the exhauster and gas producing operation, thereby gaining the valuable result of more quickly and effectively resuming the production of gas at will. In fact, when the by-pass valve is closed the exhauster immediately draws good producer-gas from the producer or generator and delivers it to the holder from which it may flow directly to the gas engine.

The preheater and vaporizer described herein is made the subject of a separate application for Letters Patent, Serial Number 391,374, filed Sept. 4, 1907.

The above described process of producing gas is not claimed herein as it is made the subject of claims in a co-pending application, Serial No. 334,821, filed September 15, 1906.

Having described my invention, what I claim, and desire to secure by Letters Patent is, 1. A cupola gas producer having at the top a central, downwardly projecting air supply chamber or pipe provided with a jacket forming an annular air passage or channel, the inner wall of which has ports opening into the interior of the chamber, an air inlet pipe connecting with the annular jacket, and a gas outlet pipe connecting with the base of the cupola, substantially as described.

2. The combination with a gas producer, of a central air supply pipe, an air inlet pipe connecting therewith and having an exterior inlet valve, a purge pipe and valve connecting with said inlet pipe, a gas outlet pipe connecting with the base, and an inlet pipe connecting with the base for admitting a blast of compressed aeriform or gaseous fluid to blow out dust and ashes from the body of fuel through the purge pipe, substantially as described.

3. The combination with a gas generator or producer, of means for admitting air centrally into a body of ignited fuel, means for drawing it downward and drawing the resulting gas down through the fuel, and means for intermittently blowing dust and ashes up through the fuel and out into the open air, substantially as described.

4. The combination with a gas generator or producer, of means for heating air, means for admitting the heated air centrally into a body of ignited fuel, means for drawing it downward and drawing the resulting gas down through the fuel, and means for intermittently blowing dust and ashes up through the fuel and out into the open air, substantially as described.

5. The combination with a gas generator or producer, of means for admitting air centrally into a body of ignited fuel, means for drawing it downward and drawing the resulting gas down through the fuel, means for heating air by the hot outgoing gas and supplying such air to the central air inlet chamber, and means for intermittently blowing dust and ashes up through the fuel and out into the open air, substantially as described.

In testimony whereof I affix my signature in presence of two witnesses.

HAWLEY PETTIBONE.

Witnesses:
CHARLES LOWELL HOWARD,
E. B. CLARK.